United States Patent [19]
Stueben et al.

[11] 4,151,055
[45] Apr. 24, 1979

[54] RADIATION CURABLE ADHESIVE COMPOSITIONS

[75] Inventors: Kenneth C. Stueben, Bridgewater; Raymond G. Azrak, Whitehouse Station; Michael F. Patrylow, Kenilworth, all of N.J.

[73] Assignee: Union Carbide Corporation, New York, N.Y.

[21] Appl. No.: 673,801

[22] Filed: Apr. 5, 1976

[51] Int. Cl.$^2$ .................... C08F 8/00; C08L 31/02
[52] U.S. Cl. .................... 204/159.15; 204/159.16; 260/23 EP; 260/23 R; 260/859 R; 260/885; 427/44; 427/54; 428/413; 428/483
[58] Field of Search ........... 204/159.15, 159.16; 427/44, 36; 260/885

[56] References Cited

U.S. PATENT DOCUMENTS

| | | | |
|---|---|---|---|
| 2,891,025 | 6/1959 | Price | 204/159.23 X |
| 2,892,716 | 6/1959 | Martin | 96/115 R |
| 2,956,904 | 10/1960 | Hendricks | 427/44 X |
| 3,551,311 | 12/1970 | Nass et al. | 204/159.18 |
| 3,625,744 | 12/1971 | Juna et al. | 204/159.23 X |
| 3,628,987 | 12/1971 | Nakata et al. | 427/44 X |
| 3,661,618 | 5/1972 | Brookman et al. | 427/44 |
| 3,840,448 | 10/1974 | Osborn et al. | 204/159.14 |
| 3,897,295 | 7/1965 | Dowbenko et al. | 427/44 X |
| 3,940,535 | 2/1976 | Gaeth et al. | 427/44 X |

FOREIGN PATENT DOCUMENTS 886003  1/1962  United Kingdom.

*Primary Examiner*—Richard B. Turer
*Attorney, Agent, or Firm*—Francis M. Fazio

[57] ABSTRACT

Compositions containing poly(vinyl alkyl ether), multifunctional acrylates, and optionally, monoacrylates and photoinitiators, when cured by exposure to radiation, produce pressure sensitive adhesives having good adhesive properties, such as peel strength, quick stick and shear time.

12 Claims, No Drawings

RADIATION CURABLE ADHESIVE COMPOSITIONS

BACKGROUND OF THE INVENTION

Ever-increasing pressures to reduce air pollution and eliminate toxic substances from work environments have created a need for adhesive compositions which are free of volatile solvents. Moreover, elmination of volatile solvents is desirable to reduce energy consumption, since heat is required to evaporate volatile solvents when curing the composition. To eliminate volatile solvents, radiation curable adhesive compositions have been developed which employ reactive solvents that become incorporated into the cured adhesive composition. Multifunctional acrylate compounds, alone or in combination with monofunctional acrylate compounds, have been found to be particularly useful as the reactive solvent portion of these compositions. However, some radiation curable compositions, such as those disclosed in Netherlands patent application No. 66.01711, contain as much as 90 weight percent of acrylates, some of which exhibit high toxicity. Reduced acrylate concentrations and thus, lower toxicity levels of radiation curable pressure sensitive adhesive compositions can sometimes be achieved by incorporating vinyl acetate based copolymers in combination with acrylate compounds. However, such compositions are less convenient to use in that they often require the use of hot melt application methods.

SUMMARY OF THE INVENTION

We have now discovered that compositions containing at least 55 weight percent of poly(vinyl alkyl ether) in combination with multifunctional acrylates and, optionally, monoacrylates and photoinitiators, can be radiation cured to a tacky state and display excellent adhesion to a variety of substrates. By the proper choice of components, one can control the viscosity of the uncured compositions so that they can often be applied as thin films at room temperature or slightly elevated temperature (e.g., 65° C.).

DESCRIPTION OF THE INVENTION

The radiation curable pressure sensitive adhesive compositions of this invention are mixtures of poly(vinyl alkyl ether), multifunctional acrylates and, optionally, monoacrylates and photoinitiators. The term "multifunctional acrylate", as used herein, means an acrylyl or methacrylyl compound having more than one

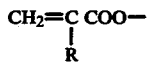

group in the molecule, where R is hydrogen or methyl. The poly(vinyl alkyl ether) employed is one in which the alkyl portion of the repeating unit contains from one to four carbon atoms. The poly(vinyl alkyl ether) has a reduced viscosity from about 0.1 to about 0.8, preferably from 0.2 to 0.4, and most preferably about 0.3, measured at a concentration of 0.1 gram of resin per 100 ml. of benzene at 20° C. From a standpoint of producing a composition having good adhesive properties, that is, peel strength, quick stick and shear time, poly(vinyl ethyl ether) is the preferred poly(vinyl alkyl ether). The poly(vinyl alkyl ether) is present in the composition at a concentration of from about 55 weight percent to about 95 weight percent.

As used throughout this application the terms "acrylate" and "monoacrylate" are meant to include the methacrylyl-bearing esters as well as acrylyl-bearing esters, that is, compounds containing one or more groups of the general formula

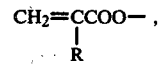

wherein R is hydrogen or methyl, and they can be either aromatic or aliphatic esters.

The multifunctional acrylates used in this invention are any of the di-, tri-, tetra-, or pentaacrylates which are known to those skilled in the art of radiation technology as being cross-linking agents in radiation curable compositions. Illustrative thereof one can mention diethylene glycol diacrylate, propylene glycol diacrylate, bisphenol-A bis(2-hydroxypropyl) acrylate, 1,3-butanediol diacrylate, 2-butene-1,4-diacrylate, dipentaerythritol monohydroxy pentaacrylate, ethylene glycol diacrylate, 1,2,6-hexanetriol diacrylate, neopentyl glycol diacrylate, pentaerythritol tetraacrylate, pentaerythritol triacylate, 1,3-propanediol diacrylate, tetraethylene glycol diacrylate, trimethylolethane triacrylate, tripropylene glycol diacrylate; acrylated epoxidized fatty oils such as acrylated epoxidized soybean oil or acrylated epoxidized linseed oil; compounds obtained by reacting about two moles of a hydroxyalkyl acrylate with one mole of an organic diisocyanate or with an isocyanato-terminated prepolymer as described in U.S. Pat. No. 3,700,643; the compounds obtained by substituting methacrylyl groups for the acrylyl groups of the foregoing compounds; or any mixture of the foregoing. The foregoing list is meant to be illustrative ony and is not meant to exclude any of those multifunctional acrylate cross-linking agents known to those skilled in the art as having utility in radiation curable adhesive compositions. The primary function of the multifunctional acrylates in the compositions of our invention is to impart cross-link density to the cured pressure sensitive adhesive. The multifunctional acrylates are present in the compositions of our invention from about 3 to about 40 weight percent, preferably from 10 to 20 weight percent.

As previously indicated, there can optionally be employed one or more monoacrylates,, which can be present from 0 to about 25 weight percent of the composition. Monoacrylates which are useful in producing adhesive compositions are known to those skilled in the art and require no further description for them to know what they are. Nevertheless, one can mention as illustrative thereof, allyl acrylate, n-amyl acrylate, benzyl acrylate, cyclohexyl acrylate, cyclopentyl acrylate, diethylaminoethyl acrylate, 2-ethoxyethyl acrylate, isopropyl acrylate, n-lauryl acrylate, nonyl acrylate, n-octadecyl acrylate, n-octyl acrylate, oleyl acrylate, 2-phenoxyethyl acrylate, 2-ethyl-hexyl acrylate, tall oil acrylate and the like, the compounds obtained when methyacrylyl groups are substituted for the acrylyl groups of the foregoing compounds, or mixtures of these. The foregoing list is meant to be illustrative only and is not meant to exclude any monoacrylates known to those skilled in the art as having utility in the production of adhesive compositions.

The monoacrylates, when present, act as viscosity reducers in the uncured compositions and impart flexibility and softness to the cured compositions.

Those skilled in the art will recognize that, when non-ionizing radiation is used, there is usually present in the radiation curable pressure sensitive adhesive composition a photoinitiator at a concentration up to about 10 weight percent, preferably from about 1 to about 5 weight percent. The photoinitiators which may be used are well known to those skilled in the art and require no further description for them to know what they are. Nevertheless, one can mention as illustrative of suitable photoinitiators, 2,2-diethoxyacetophenone, 2- or 3- or 4-bromoacetophenone, 3- or 4-bromoacetophenone, 3- or 4-allylacetophenone, 2-acetonaphthone, benzaldehyde, benzoin, the allyl benzoin ethers, benzophenone, benzoquinone, 1-chloroanthraquinone, p-diacetyl-benzene, 9,10-dibromoanthracene, 9,10-dichloro-anthracene, 4,4-dichlorobenzophenone, 1,3-diphenyl-2-propanone, fluorene, fluorenone, 1,4-naphthyl-phenylketone, 2,3-pentanedione, propiophenone, chlorothioxanthone, xanthone and the like, or any mixtures of these. We prefer to use benzophenone as the photoinitiator. The foregoing list is meant to be illustrative only and is not meant to exclude any suitable photoinitiators known to those skilled in the art.

Those skilled in the art of photochemistry are fully aware that photoactivators can be used in combination with the aforementioned photoinitiators and that synergistic effects are sometimes achieved when such combinations are used. Photoactivators are well known to those skilled in the art and require no further description for them to know what they are. Nonetheless, one can mention as illustrative of suitable photoactivators, methylamine, tributylamine, methyldiethanolamine, 2-aminoethylethanolamine, allylamine, cyclohexylamine, cyclopentadienylamine, diphenylamine, ditolylamine, trixylylamine, tribenzylamine, n-cyclohexylethylenimine, piperidine, N-methylpiperazine, 2,2-dimethyl-1,3-bis-(3-N-morpholinyl) propionyloxy)) propane, and the like, or any combination of these. The photoactivators, when used, are employed in the usual effective amounts, which are known to those skilled in the art.

The foregoing components are combined in any manner suitable for achieving a uniform composition. When the components have been mixed, they can be applied to a substrate by any means suitable for the application of adhesive films, such as, for example, reverse roll coating or curtain coating.

By the proper choice of components, which will be apparent to the skilled worker in the art from the disclosure of our invention herein, one can control various properties of the uncured or cured adhesive compositions, such as viscosity, hardness, flexibility, peel strength, quick stick and shear time. When monoacrylate viscosity reducers are used, it is preferred that the composition contain from 65 to 75 weight percent of the poly(vinyl alkyl ether), from 10 to 20 weight percent of the multifunctional acrylate and from 10 to 20 weight percent of the monoacrylate; when monoacrylate viscosity reducers are not employed, it is preferred that the composition contain from 80 to 90 weight percent of the poly(vinyl alkyl ether), based on the total weight of the radiation curable pressure sensitive adhesive composition.

The viscosities of the uncured pressure sensitive adhesive compositions of this invention vary, depending on the particular formulation used. In one typical embodiment, an uncured composition of 85.5 weight percent poly(vinyl ethyl ether), 12.5 weight percent neopentyl glycol diacrylate and 2 weight percent benzophenone had a Brookfield viscosity of 120,000 cps. at 22° C., 25,000 cps. at 40° C. and 6,100 cps. at 60° C. In another embodiment, a cured composition of 69 weight percent poly(vinyl ethyl ether), 15 weight percent neopenty glycol diacrylate, 15 weight percent 2-ethoxyethyl acrylate and 1 weight percent benzophenone had a Brookfield viscosity of 8,800 cps. at 22° C., 2,300 cps. at 40° C. and 1,100 cps. at 60° C. By the proper choice of the components herein specified, one skilled in the art can easily produce compositions which can be applied as films at room temperature or slightly elevated temperatures below 65° C. and which have excellent adhesive properties when cured. It is to be understood, however, that there can be produced useful radiation curable adhesive compositions, as described herein, which must be heated to temperatures greater than 65° C. to be applied as films, and that such compositions are within the scope of our invention.

The applied composition can be cured by the known radiation curing methods such as exposure to electron beam or ultraviolet radiation. The cured formulation is believed to comprise a cross-linked matrix of a graft copolymer of the poly(vinyl alkyl ether) and the acrylates, which is plasticized and tackified by the presence of some unreacted poly(vinyl alkyl ether). The cured compositions of this invention exhibit excellent adhesion to a variety of substrates including, but not limited to, steel, aluminum, glass and thermoplastics. Moreover, they show good adhesive properties, such as peel strength, quick stick and shear time, as illustrated in the examples below. Irradiation of the composition can be performed using any of the known and commonly available types of radiation curing equipment. For example, curing may be done by low, medium or high pressure mercury lamps or with a swirlflow plasma arc radiation source by the process disclosed in U.S. Pat. No. 3,650,699. Curing may be carried out in an air atmosphere or in an inert gas atmosphere, such as nitrogen or argon. Exposure time required to cure the composition varies with the formulation, type and wavelength of radiation, energy flux, concentration of photoinitiator and film thickness. Those skilled in the art of radiation technology will be able to determine the proper curing time for any particular composition. Generally, cure time is rather short, that is, less than 20 seconds.

Adhesive properties of the cured compositions of this invention were determined by standard test procedures of the Pressure Sensitive Tape Council. Peel strength was measured by the procedure designated PSTC-1, quick stick by PSTC-5 and shear time by PSTC-7, with the exception that the shear test was modified to use a ½-in. by ½-in. test area, except where otherwise indicated in the examples, and cold rolled steel Q-panels were used in place of chrome plated steel in the peel test. The examples which follow further illustrate the invention herein described and are not intended to limit the invention in any way. In the examples, the poly(vinyl ethyl ether) employed had a reduced viscosity of about 0.3, measured at a concentration of 0.1 grams of resin per 100 ml. of benzene at 20° C. and contained 0.5% mono-tertiary butylhydroquinone stabilizer.

EXAMPLE 1

A series of radiation curable pressure sensitive adhesive compositions was prepared by mixing to a uniform composition poly(vinyl ethyl ether), neopentyl glycol diacrylate and benzophenone in the weight percentages indicated in the table below. The compositions were applied at room temperature to a polyethylene terephthalate tape substrate using a drawdown bar, at an average film thickness of 1½ mils. The adhesive coated substrates were cured by exposure in air to ultraviolet light from three 2.2-kw, medium pressure mercury arc lamps, each 24 in. in length. Total delivered flux from the lamps was 500 watts/sq. ft. Exposure times for the various formulations are indicated. The irradiated adhesive coated substrates were tested for peel strength, quick stick and shear time. The results, reported in the table below, indicate that the cured compositions generally had an excellent balance of adhesive properties. Values indicted in the table are the averages for two samples.

| Composition* | Exposure Time Seconds | Peel Strength lb./in. | Quick Stick lb./in. | Shear time, hrs. |
|---|---|---|---|---|
| 78/20/2 | 4 | 1.5 | — | >60 |
| 81/16/3 | 2 | 1.7 | 1.6 | >47 |
| 81/16/2 | 4 | 2.2 | 2.4 | >42 |
| 83.5/4.5/2 | 4 | 2.2 | 1.3 | >70 |
| 84/13/3 | 2 | 1.8 | 1.6 | >45 |
| 85/13/2 | 2 | 2.8 | 2.5 | 51 |
| 85.5/12.5/2 | 4 | 3.2 | 2.0 | >60 |
| 86.5/11.5/2 | 4 | 2.7 | 2.3 | >90 |
| 87/10/3 | 2 | 2.5 | 2.7 | >42 |
| 93/5/2 | 4 | 3.4 | 3.2 | 0.42 |

*Poly(vinyl ethyl ether)/neopentyl glycol diacrylate/benzophenone, weight percent.

EXAMPLE 2

A radiation curable pressure sensitive adhesive composition containing 68 weight percent poly(vinyl ethyl ether), 15 weight percent neopentyl glycol diacrylate, 15 weight percent 2-ethoxyethyl acrylate and 2 weight percent benzophenone was prepared, applied to a polyethylene terephthalate tape substrate and cured in a manner similar to that described in Eample 1, using a 2.35 second exposure to the medium pressure mercury lamps. The cured adhesive on the substrate had a peel strength of 1.3 lb./in. and a shear time, measured on a 1-in. by 1-in. test area, of greater than 66 hours.

EXAMPLE 3

A radiation curable pressure sensitive adhesive composition containing 69 weight percent poly(vinyl ethyl ether), 15 weight percent pentaerythritol triacrylate, 15 weight percent 2-ethoxyethyl acrylate and 1 weight percent benzophenone was prepared, applied to a polyethylene terephthalate substrate and cured in a manner similar to that described in Example 1, using a 2.35 second exposure to the ultraviolet light. The cured adhesive on the substrate had a peel strength of 1.8 lb./in. and a shear time greater than 70 hours.

EXAMPLE 4

A radiation curable pressure sensitive adhesive composition containing 69 weight percent poly(vinyl ethyl ether), 15 weight percent neopentyl glycol diacrylate, 15 weight percent methoxy polyethylene glycol acrylate having a molecular weight of about 615 and 1 weight percent benzophenone was prepared, applied to a polyethylene terephthalate tape substrate and cured in a manner similar to that described in Example 1, using a 4 second exposure to the ultraviolet light. The cured adhesive on the substrate had a peel strength of 1.4 lb./in., a quick stick of 1.4 lb./in. and a shear time of 1.16 hours.

EXAMPLE 5

A radiation curable pressure sensitive adhesive composition containing 70 weight percent poly(vinyl ethyl ether), 14 weight percent pentaerythritol triacrylate, 15 weight percent 2-ethylhexyl acrylate and 1 weight percent benzophenone was prepared, applied to a polyethylene terephthalate tape substrate and cured in a manner similar to that described in Example 1, using a 4 second exposure to the ultraviolet light. The cured adhesive on the substrate had a peel strength of 1.9 lb./in., and a shear time of greater than 120 hours.

EXAMPLE 6

A radiation curable pressure sensitive adhesive composition containing 70 weight percent poly(vinyl ethyl ether), 14 weight percent pentaerythritol triacrylate, 15 weight percent 2-ethoxyethyl acrylate and 1 weight percent benzophenone was prepared, applied to a polyethylene terephthalate tape substrate and cured in a manner similar to that described in Example 1 using a 4 second exposure to the ultraviolet light. The cured adhesive on the substrate had a peel strength of 1.9 lb./in. and a shear time of greater than 120 hours.

EXAMPLE 7

A radiation curable pressure sensitive adhesive composition was prepared as a mixture of 69 weight percent poly(vinyl ethyl ether), 15 weight percent neopentyl glycol diacrylate, 15 weight percent 2-ethoxyethyl acrylate and 1 weight percent diethoxyacetophenone. The radiation curable adhesive composition was applied to a polyethylene terephthalate substrate using a drawdown bar at an average film thickness of 1½ mils. The adhesive coated substrate was cured by an 8 second exposure in nitrogen to ultraviolet light of 2537 Angstrom units at a delivered flux of 65 watts/sq. ft. by the process described in U.S. Pat. No. 3,840,448, followed immediately by a 4 second exposure in air to the same medium pressure mercury arc lamps as were used in Example 1. The cured adhesive on the substrate had a peel strength of 1.2 lb./in. and a shear time, based on a 1-in. by 1-in. test area, of 3.5 hours. The results of this example illustrate that cured compositions of this invention having good adhesive properties can be obtained using diethoxyacetophenone as the photoinitiator.

EXAMPLE 8

A radiation curable pressure sensitive adhesive composition containing 85 weight percent of poly(vinyl methyl ether) having a reduced viscosity of 0.7 dl./g., measured at a concentration of 0.2 grams of resin in 100 ml. of chloroform at 25° C., 13 weight percent neopentyl glycol diacrylate and 2 weight percent benzophenone was prepared. In preparing the composition the poly(vinyl methyl ether) was heated to 60° C. and the neopentyl glycol diacrylate and benzophenone were added with efficient mixing. The warm radiation curable pressure sensitive adhesive composition produced was applied to a polyethylene terephthalate tape substrate, using a drawdown bar, at an average film thickness of 1½ mils. A section of the uncured adhesive composition on the tape had a shear time of 10 min. The adhesive coated substrate was cured by a 6 second exposure in air to the same medium pressure mercury arc lamps as were used in Example 1. The cured adhesive on the substrate had a peel strength of 2.7 lb./in., a quick stick of 3.5 lb./in. and a shear time of 5 hours, using a shear test area of 1 in. by 1 in. The results of this example illustrate that cured compositions of this invention having good adhesive properties can be obtained using poly(vinyl methyl ether).

EXAMPLE 9

A radiation curable pressure sensitive adhesive composition containing 85 weight percent poly(vinyl ethyl ether), 13 weight percent neopentyl glycol diacrylate and 2 weight percent benzophenone was prepared, applied to a polyethylene terephthalate substrate, using a drawdown bar, at an average film thickness of 1½ in. and cured by a 4 second exposure in air to the same medium pressure mercury arc lamps as were used in Example 1. Peel strength of the cured adhesive on the substrates was then measured in contact with surfaces of aluminum, cold rolled steel, glass, Formica* and acrylonitrile-butadiene-styrene copolymer. The results, reported in the table below, show that the cured pressure sensitive adhesive composition of this invention exhibits excellent adhesion to a variety of surfaces.
*Formica Co.'s trademark for pressure laminated sheets containing melamine-phenolic thermoset resins.

| Cured coated substrate to: | Peel Strength, lb./in. |
|---|---|
| Aluminum | 2.5 |
| Steel | 2.3 |
| Glass | 2.3 |
| Formica | 2.3 |
| Acrylonitrile-Butadiene-Styrene | 2.2 |

*Formica Co.'s trademark for pressure laminated sheets containing melamine-phenolic thermoset resins.

EXAMPLE 10

A radiation curable pressure sensitive adhesive composition was prepared by mixing to a uniform composition 82 weight percent poly(vinyl ethyl ether), 16 weight percent acrylated epoxidized linseed oil and 2 weight percent benzophenone. The radiation curable pressure sensitive adhesive composition was applied to a polyethylene terephthalate tape substrate and cured in a manner similar to the compositions of Example 1, using a 4 second exposure to the ultraviolet light. The cured adhesive on the substrate had a peel strength of 2 lb./in.

EXAMPLE 11

A radiation curable pressure sensitive adhesive composition was prepared by mixing to a uniform composition 85 weight percent poly(vinyl ethyl ether), 13 weight percent acrylated epoxidized soybean oil and 2 weight percent benzophenone. The radiation curable pressure sensitive adhesive composition was applied to a polyethylene terephthalate tape substrate and cured in a manner similar to the compositions of Example 1, using a 2.4 second exposure to the ultraviolet light. The cured adhesive on the substrate had a peel strength of 1.9 lb./in.

EXAMPLE 12

A series of three radiation curable adhesive compositions was prepared by mixing, in each case, 69 weight percent poly(vinyl ethyl ether), 1 weight percent benzophenone, 15 weight percent neopentyl glycol diacrylate and 15 weight percent of a urethane acrylate oligomer. The urethane acrylate oligomers, referred to below as oligomer A, oligomer B and oligomer C, were each prepared in a 4-necked flask (1 liter for oligomers A and B, 12 liters for oligomer C) fitted with a stirrer thermometer, reflux condenser and two dropping funnels (except for oligomer C which was prepared using a single dropping funnel). The 12 liter flask additionally contained a tube filled with desiccant material, positioned above the liquid level, to prevent moisture from contacting the reactants. The following materials were charged to the flasks and dropping funnels:

| Flask | Weight, g. | | |
|---|---|---|---|
| | Oligomer A | Oligomer B | Oligomer C |
| Isophorone diisocyanate | 222 | 222 | 2397.6 |
| 2-Ethylhexyl acrylate | 138 | 50 | 1660.5 |
| Dibutyltin dilaurate | 0.6 | 0.6 | 16.2 |
| Dropping funnel #1 | | | |
| Polycaprolactone diol[1] | 176 | — | 2862(1st charge) |
| Esterdiol[2] | 34 | 102 | — |
| 2-Ethylhexyl acrylate | — | 62 | — |
| Hydroxyethyl acrylate | — | — | 1382.4(2nd charge) |
| Dropping funnel #2 | | | |
| Hydroxyethyl acrylate | 122 | 122 | — |

[1]A diethylene glycol initiated polymer of epsilon caprolactone having an average molecular weight of about 530.
[2]$HOCH_2C(CH_3)CH_2OCOC(CH_3)_2CH_2OH$ In each oligomers preparation, the contents of the flask were charged first and raised to a temperature of about 50° C., and the contents of the dropping funnels were then charged. In preparing oligomers A and B, contents of dropping funnel #1 were added to the mixture in the flask, dropwise, while maintaining the temperature of the mixture at between 45° C. and 60° C. One-half the contents of dropping funnel #2 were then added to the mixture in the flask, dropwise, followed by addition of the remaining contents of dropping funnel #1 and the remaining contents of dropping funnel #2. In preparing oligomer C, the polycaprolactone diol was first charged to the dropping funnel and added dropwise to the mixture in the flask. After 2 hours of stirring at between 45° C. and 50° C., the hydroxyethyl acrylate was charged to the dropping funnel and added, dropwise, to the mixture in the flask.

The contents of each of the flasks were allowed to react at between 45° C. and 60° C. until the free —NCO content reached below about 0.4% by weight. The resultant reaction product in each of the flasks was the oligomer employed in the radiation curable adhesive composition.

The radiation curable adhesive compositions containing oligomer A, oligomer B and oligomer C, respectively, were applied to polyethylene terephthalate tape substrates and cured in a manner similar to the compositions of Example 1, using a 3 second exposure to ultraviolet light. The cured adhesives containing oligomer A, oligomer B and oligomer C had peel strengths of 3.2, 2.6 and 3.2 lb./in., respectively.

EXAMPLE 13

A series of radiation curable pressure sensitive adhesive compositions were prepared by mixing to a uniform consistency poly(vinyl ethyl ether), neopentyl glycol diacrylate and benzophenone in the amounts indicated in the table below. Each of the radiation curable pressure sensitive adhesive compositions was applied to a polyethylene terephthalate tape substrate, using a drawdown bar, at an average film thickness of about 1½ mils. The radiation curable pressure sensitive adhesive compositions on the substrates were cured by exposure to electron beam radiation produced by a 150 kilovolt, 3 miliampere electron beam generator in an atmosphere of 1,000 ppm $O_2$. The amounts of electron beam energy which were applied to cure the compositions are indicated in the table. Each of the cured pressure sensitive adhesives on the substrates was tested for peel strength, which appears in the table.

| Composition | Exposure, megarads | Peel Strength, lb./in. |
|---|---|---|
| 88/10/2 | 20 | 1.55 |
| 85.5/12.5/2 | 10 | 1.45 |
| 85.5/12.5/2 | 15 | 1.10 |
| 85.5/12.5/2 | 20 | 1.10 |
| 87.25/12.75/0 | 10 | 0.70 |
| 87.25/12.75/0 | 15 | 1.20 |
| 87.25/12.75/0 | 20 | 1.25 |

What is claimed is:

1. A radiation curable pressure sensitive adhesive composition comprising (a) from 80 to 90 weight percent of a poly(vinyl alkyl ether) having a reduced viscosity of from 0.1 to 0.8, measured at a concentration of 0.1 grams of resin in 100 ml. of benzene at 20° C., in which the alkyl unit has from 1 to 4 carbon atoms, (b) from 10 to 20 weight percent of a multifunctional acrylate compound, and (c) from 0 to 10 weight percent of a photoinitiator.

2. A radiation curable pressure sensitive adhesive composition as claimed in claim 1, wherein component (c) is present at a concentration of from 1 to 5 weight percent.

3. A radiation curable pressure sensitive adhesive composition as claimed in claim 1, wherein the poly(vinyl alkyl ether) has a reduced viscosity of from 0.2 to 0.4, measured at a concentration of 0.1 grams of resin in 100 ml. of benzene at 20° C.

4. A radiation curable pressure sensitive adhesive composition as claimed in claim 1, wherein the poly(vinyl alkyl ether) is poly(vinyl ethyl ether).

5. A radiation curable pressure sensitive adhesive composition as claimed in claim 2, wherein the poly(vinyl alkyl ether) is poly(vinyl ethyl ether).

6. A radiation curable pressure sensitive adhesive composition as claimed in claim 3, wherein the poly(vinyl alkyl ether) is poly(vinyl ethyl ether).

7. A radiation curable pressure sensitive adhesive composition as claimed in claim 1, wherein the poly(vinyl alkyl ether) is poly(vinyl methyl ether).

8. A radiation curable pressure sensitive adhesive composition comprising (a) from 65 to 75 weight percent of a poly(vinyl alkyl ether) having a reduced viscosity of from 65 to 75 weight percent of a poly(vinyl alkyl ether) having a reduced viscosity of from 0.1 to 0.8, measured at a concentration of 0.1 grams of resin in 100 ml. of benzene at 20° C., in which the alkyl unit has from 1 to 4 carbon atoms, (b) from 10 to 20 weight percent of a multifunctional acrylate compound, (c) from 10 to 20 weight of a monoacrylate compound, and (d) from 0 to 10 weight percent of a photoinitiator.

9. A radiation curable pressure sensitive adhesive composition as claimed in claim 8, wherein component (d) is present at a concentration of from 1 to 5 weight percent.

10. A radiation curable pressure sensitive adhesive composition as claimed in claim 8, wherein the poly(vinyl alkyl ether) has a reduced viscosity of from 0.2 to 0.4, measured at a concentration of 0.1 grams of resin in 100 ml. of benzene at 20° C.

11. A radiation curable pressure sensitive adhesive composition as claimed in claim 9, wherein said poly(vinyl alkyl ether) is poly(vinyl ethyl ether).

12. A radiation curable pressure sensitive adhesive composition as claimed in claim 10, wherein said poly(vinyl alkyl ether) is poly(vinyl ethyl ether).

* * * * *